United States Patent
Roger et al.

(10) Patent No.: US 11,994,613 B2
(45) Date of Patent: May 28, 2024

(54) RADAR DEVICE WITH INTEGRATED SECURITY CAPABILITY

(71) Applicant: Infineon Technologies AG, Neubiberg (DE)

(72) Inventors: Andre Roger, Munich (DE); Romain Ygnace, Brunnthal (DE)

(73) Assignee: Infineon Technologies AG, Neubiberg (DE)

( * ) Notice: Subject to any disclaimer, the term of this patent is extended or adjusted under 35 U.S.C. 154(b) by 778 days.

(21) Appl. No.: 16/949,654

(22) Filed: Nov. 9, 2020

(65) Prior Publication Data

US 2021/0141055 A1    May 13, 2021

(30) Foreign Application Priority Data

Nov. 11, 2019    (DE) .......................... 102019130388.5

(51) Int. Cl.
*G01S 7/40*    (2006.01)
*G06F 21/44*    (2013.01)

(52) U.S. Cl.
CPC .............. *G01S 7/40* (2013.01); *G01S 7/4008* (2013.01); *G01S 7/4021* (2013.01); *G06F 21/44* (2013.01); *G01S 7/4013* (2021.05)

(58) Field of Classification Search
CPC .......... G01S 13/931; G01S 7/003; G01S 7/40; G01S 7/4008; G01S 7/4013; G01S 7/4021; G06F 21/44; G06F 21/52; G06F 21/71; G06F 21/79

See application file for complete search history.

(56) References Cited

U.S. PATENT DOCUMENTS

| | | | |
|---|---|---|---|
| 10,996,311 B2 | 5/2021 | Roger et al. | |
| 11,567,190 B2 | 1/2023 | Ben Khadhra et al. | |
| 2018/0113209 A1 | 4/2018 | Campbell | |
| 2019/0129002 A1* | 5/2019 | Roger | G01S 7/032 |
| 2020/0174111 A1* | 6/2020 | Zhao | G08B 29/24 |
| 2020/0204541 A1* | 6/2020 | Nair | H04L 63/0853 |
| 2020/0341114 A1* | 10/2020 | Acharya | G01S 13/723 |
| 2020/0410072 A1* | 12/2020 | Giusti | G01S 13/56 |
| 2021/0025969 A1* | 1/2021 | Ouchi | G01S 13/931 |

FOREIGN PATENT DOCUMENTS

| | | |
|---|---|---|
| CN | 109387814 A | 2/2019 |
| CN | 109844562 A | 6/2019 |
| CN | 110140059 A | 8/2019 |
| DE | 102016208453 A1 | 12/2017 |
| DE | 102018120655 A1 | 2/2019 |
| DE | 102017215614 A1 | 3/2019 |
| DE | 102018200396 A1 | 7/2019 |
| DE | 102018205125 A1 | 10/2019 |
| DE | 102018219841 A1 | 5/2020 |

\* cited by examiner

*Primary Examiner* — Timothy X Pham
(74) *Attorney, Agent, or Firm* — Harrity & Harrity, LLP

(57) ABSTRACT

A radar device is provided comprising a first processing unit, a radar circuitry, at least one security circuitry, at least one secure memory, and a secure interface arranged for communicating with a second processing unit that is external to the radar device, wherein the first processing unit is arranged to configure and/or run the radar device based on parameters obtained via the secure interface from the second processing unit.

17 Claims, 1 Drawing Sheet

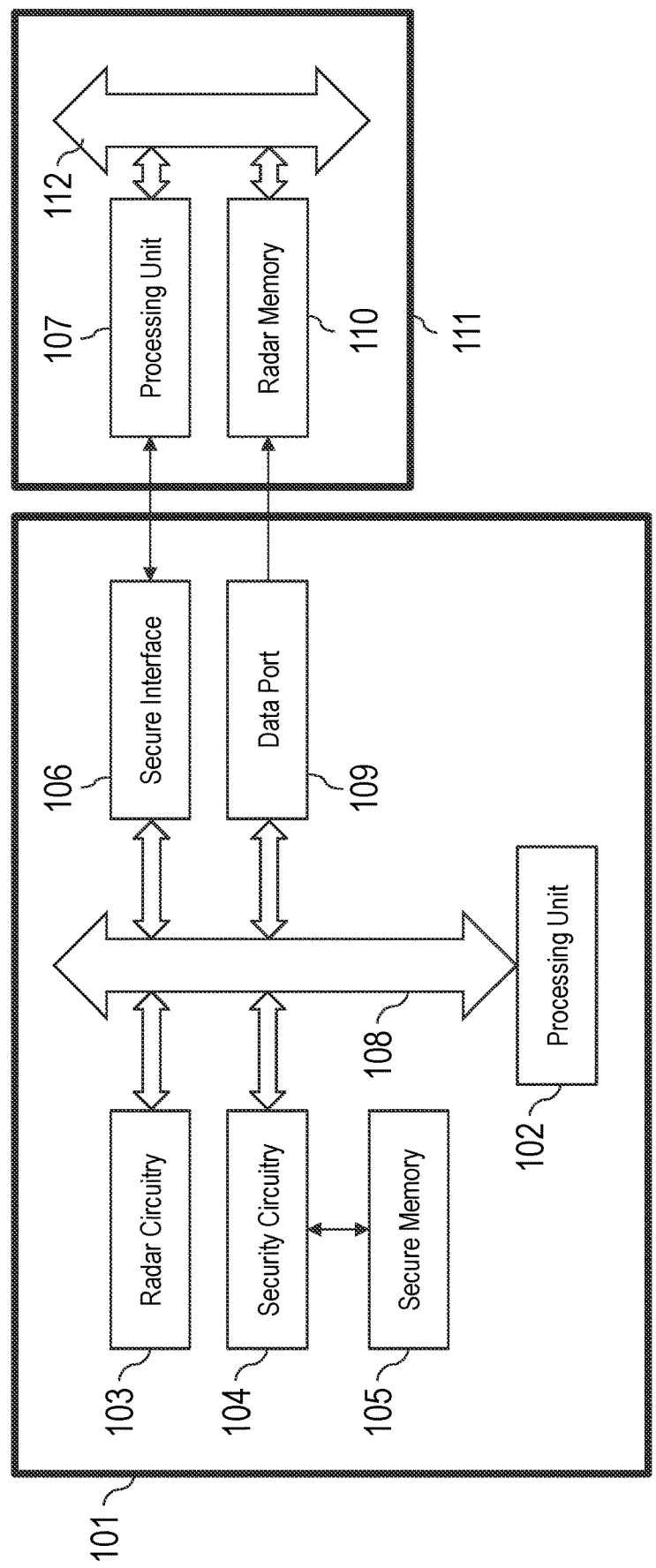

RADAR DEVICE WITH INTEGRATED SECURITY CAPABILITY

CROSS REFERENCE TO RELATED APPLICATION

This application claims priority to German Patent Application No. 102019130388.5 filed on Nov. 11, 2019, the content of which is incorporated by reference herein in its entirety.

TECHNICAL FIELD

Implementations of the present application relate to radar applications, such as an efficient way to process radar signals obtained by at least one radar sensor, e.g., via at least one antenna. Processing radar signals in this regard refers to radar signals received by a sensor or an antenna.

BACKGROUND

Several radar variants are used in cars for various applications. For example, radar can be used for blind spot detection (parking assistant, pedestrian protection, cross traffic), collision mitigation, lane change assist and adaptive cruise control. Numerous use case scenarios for radar appliances may be directed to different directions (e.g., back, side, front), varying angles (e.g., azimuth direction angle) and/or different distances (short, medium or long range). For example, an adaptive cruise control may utilize an azimuth direction angle amounting to ±18 degrees, the radar signal is emitted from the front of the car, which allows a detection range up to several hundred meters.

BRIEF SUMMARY

A radar source emits a signal and a sensor detects a returned signal. A frequency shift between the emitted signal and the detected signal (based on, e.g., a moving car emitting the radar signal) can be used to obtain information based on the reflection of the emitted signal. Front-end processing of the signal obtained by the sensor may comprise a Fast Fourier Transform (FFT), which may result in a signal spectrum, e.g. a signal distributed across the frequency. The amplitude of the signal may indicate an amount of echo, wherein a peak may represent a target that is to be detected and used for further processing, e.g., adjust the speed of the car based on another car travelling in front.

A radar processing device may provide different types of outputs, e.g., a command to a control unit, an object or an object list to be post-processed by at least one control unit, at least one FFT peak to be post-processed by at least one control unit. Utilizing FFT peaks enables high performance post processing.

Constant false alarm rejection (CFAR), also referred to as constant false alarm rate, is a threshold method for FFT result analysis which may be based on a signal power. CFAR allows adapting a threshold to decide whether the FFT signal indicates a potential target. CFAR in particular considers background noise, clutter and interference.

Implementations described herein may improve the security of existing solutions and in particular to efficiently process signals in a radar system.

The examples suggested herein may in particular be based on at least one of the following implementations. In particular combinations of the following features could be utilized. The features of the method could be combined with any feature(s) of the device, apparatus or system or vice versa.

A radar device is provided, comprising
  a first processing unit,
  a radar circuitry,
  at least one security circuitry,
  at least one secure memory,
  a secure interface arranged for communicating with a second processing unit that is external to the radar device,
  wherein the first processing unit is arranged to configure, monitor and/or run the radar device based on parameters obtained via the secure interface from the second processing unit.

Hence, the radar device comprises one processor (here: the first processing unit) that is capable of supplying radar application services as well as security services via the security circuitry that may in particular utilize the at least one secure memory.

The at least one secure memory may be any memory that is part of the radar device, in particular part of the security circuitry or associated with the security circuitry. It may be hardened against attacks. It may also be functionally encapsulated such that data cannot be conveyed beyond the radar device.

It is noted that the first processing unit can also be (at least partially) configured based on data locally available at the device. However, the first processing unit enables setting up parameters and/or configurations based on the communication utilizing the secure interface. Hence, the secure interface may be used to determine or adjust the functionality of the radar device.

The second processing unit hence accesses the first processing unit or services provided by the first processing unit only via the secure interface and not directly. In this regard, the functionalities provided by the first processing unit to the outside of the radar device are encapsulated (or "hidden") and can only be accessed as defined, e.g., by an API (application programming interface).

A level of security used via the secure interface may be set depending on predefined conditions or requirements. The secure interface may only accept encrypted information from an authenticated second processing unit. As an option, the level of security may be reduced for a predefined subset of the communication, which may then not require encrypted communication and/or authentication.

The second processing unit may be any source or destination that may be used as a logical or physical entity to communicate with the radar device across the secure interface.

The communication between the first processing unit and the second processing unit may be realized by using a shared memory as the secure interface. The shared memory may be the secure memory, a portion of the secure memory or any other memory of the radar device. As an alternative, the communication may be realized by sending and receiving (encrypted or non-encrypted) messages (also referred to as message-exchange or messaging).

The shared memory may comprise at least one register, in particular in case the interface utilizes or is a serial interface. The interface may be a serial-to-parallel interface (SPI), an I2C interface, a Controller Area Network (CAN) or an Ethernet.

Examples described herein may in particular add or improve the security of existing solutions at different levels, e.g., at the end user, the OEM, a tier-1 supplier or a semiconductor device supplier. Also, cost and competitiveness of the solution are preserved.

The added security enables a semiconductor manufacturer to sell one type of physical device while enabling, disabling and/or restricting features available on the silicon.

Also, the added security on a radar device may enable a tier-1 supplier to implement additional functionalities to a system using this radar device, e.g., enabling, disabling and/or restricting system level functionalities to a system using the radar device.

With the use of car network or software update other the air, such additional functionalities may be provided at different instants during the lifetime of a radar semiconductor component or a radar electronic module. Examples for such instants during the lifetime are: at the production site, at the first activation inside an electronic control unit (ECU), at the first activation inside a car, another activation during the lifetime of the car.

According to an implementation, the second processing unit is authenticated with the first processing unit.

According to an implementation, the communication between the first processing unit and the second processing unit is at least partially encrypted.

Symmetric and/or asymmetric encryption (public key encryption, PKE) can be utilized.

According to an implementation, the device is an MIMIC or it is part of an MMIC.

According to an implementation, the device provides an application programming interface to enable the communication with the second processing unit.

The application programming interface (API) may define a set of commands or messages or any other means of communication to exchange information between the first processing unit and the second processing unit. The API may in particular define ways for the second processing unit to impact the first processing unit. There may not be any additional direct access beyond the API, which hardens the radar device against unwanted access.

The first processing unit may also be used to implement functional safety services like off-line hardware built-in self-tests or on-line hardware monitoring. In such case, results of self-tests or monitoring can be shared to the second processor using the secure interface.

According to an implementation, the secure interface utilizes a secured data exchange memory.

According to an implementation, the radar circuitry may comprise at least one of the following:
    a phase-locked-loop,
    a transmission circuitry,
    a reception circuitry,
    an analog-to-digital-converter,
    a filter.

According to an implementation, the security circuitry comprises means to conduct symmetric or asymmetric encryption, authentication, at least one hash function and/or signature processing.

According to an implementation, the at least one secure memory comprises at least one key and/or at least one seed.

According to an implementation, at least one key is associated with an activation or a deactivation of a feature of the radar circuitry and/or the first processing unit.

Hence, a secured service of the device can be enabled or disabled based on a key.

According to an implementation, at least one key sets a range (which may be directed to restricting the range) of the radar circuitry, in particular at least one of the following ranges:
    a transmission power,
    a transmission bandwidth,
    a sampling rate.

According to an implementation, at least one key sets a number of available transmission channels and/or a number of available receiving channels.

According to an implementation, at least one key is associated with a unique identifier that is transmitted by the radar circuitry utilizing a FMCW or a PMCW modulation.

According to an implementation, the at least one secure memory comprises data that is used for booting the first processing unit.

Also, a vehicle is suggested comprising at least one device as described herein.

Furthermore, a method is provided for operating and/or configuring a radar device
    wherein the radar device comprises
        a first processing unit,
        a radar circuitry,
        at least one security circuitry,
        at least one secure memory,
        a secure interface arranged for communicating with a second processing unit that is external to the radar device,
    wherein the method comprises:
        operating and/or configuring the radar device via the first processing unit based on parameters obtained via the secure interface from the second processing unit.

Also, a computer program product is suggested, which is directly loadable into a memory of a digital processing device, comprising software code portions for performing the steps of the method as described herein.

BRIEF DESCRIPTION OF THE DRAWINGS

Implementations are shown and illustrated with reference to the drawing. The drawing serve to illustrate the basic principle, so that only aspects for understanding the basic principle are illustrated.

FIG. 1 shows an example diagram of a radar device in combination with an external device, wherein the radar device or the combination of the radar device and the external device is/are implemented as an MMIC device.

DETAILED DESCRIPTION

Examples described herein in particular suggest an MIMIC (Monolithic Microwave Integrated Circuit) device providing RF (radio-frequency) functionalities as well as security functionalities. Such security functionalities are also referred to as security services that may be provided by a dedicated security circuitry. The security circuitry may in particular utilize a secure memory, which is hardened against attacks from outside the MMIC device storing secret information like at least one key or at least one seed.

Hence, a radar device is suggested comprising also a security functionality via the security circuitry. This is in particular beneficial with rising security requirements in particular in the automotive field utilizing radar applications. Another advantage is the combined functionality that allows providing a single radar device covering a multitude of different functionalities/services, also with regard to security and/or safety, in particular with optimized costs by sharing some of the resources that are part of the first processing unit like CPU-core, system bus and/or interrupt controller.

FIG. 1 shows an example diagram of a radar device 101 that may be implemented as an MMIC device. The radar device 101 comprises

- a processing unit 102, which may be a processor, a CPU, a microcontroller or any other (core) processing unit. It is noted that the processing unit 102 may comprise a CPU core, its bus system, an interrupt controller, a local memory for storing program and/or data;
- a radar circuitry 103, which may be a radar circuitry handling receiving signals as well as providing signals to be transmitted via at least one antenna. The radar circuitry 103 may comprise at least one of the following: a transmitter, a receiver, an analog-to-digital converter, at least one filter, a phase-locked loop circuit or the like;
- a security circuitry 104 which conducts security relevant functions, e.g., encryption, decryption, authentication, compiling and verifying signatures, hash functions, compiling (pseudo) random numbers via, e.g., a random generator or a true random generator;
- a secure memory 105, which is associated with the security circuitry 104. For example, the secure memory 105 may comprise at least one key and/or at least one seed, which may be exclusively accessed via the security circuitry 104;
- a secure interface 106 which may be used for communicating with a processing unit 107 of a device 111 external to the radar device 101. Such communication towards the (external) processing unit 107 may be conducted via any communication means, e.g., a serial interface, a parallel interface or a combination thereof.

The processing unit 102, the radar circuitry 103, the security circuitry 104 and the secure interface 106 may communicate via a communication bus 108. The secure memory 105 may be connected to this communication bus 108, it may be part of the security circuitry 104 or it may be directly connected to (only) the security circuitry 104.

The secure memory 105 may be used for booting the processing unit 102. As an option, another memory may be connected to the communication bus 108, which may also be used as internal memory for the radar device 101 and for booting the processing unit 102.

Optionally, the radar device 101 may also comprise a data port 109, which may comprise an analog-to-digital converter. This data port 109 may be connected to the communication bus 108 and it may supply data to a radar memory 110 of the external device 111. It is noted that the processing unit 107 and the radar memory 110 as well as other components may be connected to a communication bus 112 of the external device 111.

Hence, the solution presented suggests that the radar device 101 may provide an application programming interface (API) via the secure interface 106 that allows setting up parameters and configurations of the radar device 101 via the external device 111. It is, however, also an option that setting up parameters and configurations of the radar device 101 is done at least partially locally without any interaction across the secure interface 106. For example, the secure memory 105 or any other memory of the radar device 101 can be used for booting the processing unit 102 and/or for providing parameters and/or configuration information.

Hence, the API encapsulates the access towards the radar device 101 such that only predetermined actions/commands are allowed.

As an option, the secure interface 106 may ensure a predetermined level of security, which may be set by the radar device 101 and/or by a user. For example, the secure interface 106 may be set such that only encrypted information from an authenticated source is accepted.

Hence, the external device 111 (e.g. the processing unit 107) may authenticate before being allowed to configure or set up parameters of the radar device 101.

The radar device 101 may thus be configured via the API and any device or user external to the radar device 101 does not need to have any internal knowledge about the radar device 101 beyond the API definition.

Functional safety services may be provided by the radar device 101, which may conduct a self-test and report the results of such self-test.

As an option, the secure interface may at least partially be realized as a shared memory, e.g., a secure memory or a portion of a secure memory.

The security circuitry 104 may provide security functionalities such as authentication and/or encryption. It is noted that "encryption" may refer to both, an actual coding as well as a decoding functionality ("decryption"). The security circuitry 104 may provide symmetric and/or asymmetric encryption (and decryption), authentication, signature processing, hash functions or the like. The security circuitry 104 may utilize at least one key, which may be stored in the secure memory 105. Also, the security circuitry 104 may generate random values or pseudo-random values based on at least one seed, which may be stored in the secure memory 105.

A seed may be a number (or vector), which could be used to initialize a (pseudo-)random number generator. It is in particular an option that the seed is used to generate several (e.g., pseudo-random) numbers (or vectors) that may at least partially be used as initial hash values.

At least one of the keys may be associated with an activation or a deactivation of a feature of the radar circuitry and/or the first processing unit. Further, at least one key may set a range of the radar circuitry, in particular at least one of the following ranges:

a transmission power,
  a transmission bandwidth,
  a sampling rate.

In addition, at least one key may set a number of available transmission channels and/or a number of available receiving channels.

Secured parameters can be provided to the radar circuitry via the secure interface 106: For example, at least one of the following can be supplied: coded transmitters for frequency modulated continuous wave (FMCW), pseudo-code for phase modulated continuous wave (PMCW), pseudo-random modulation or a start frequency for FMCW.

It is noted that the radar device 101 may be implemented as an MMIC or the radar device 101 together with the external device 111 may be implemented as an MIMIC.

The processing unit 107 may use the radar device 101 as a subsystem and thereby provides non-secure as well as secure applications.

For example, the radar device 101 may be set up such that a valid authentication is required (from the processing unit 107) before the processing unit 102 boots from a memory (e.g., an internal memory, the secure memory 105, an additional memory or any combination thereof).

The processing unit 107 does not have any direct access to the radar circuitry 103. Such access is exclusively facilitated via the processing unit 102.

An example implementation may be as follows: The processing unit 102 is booted after it has received a (valid) trigger to conduct the start-up. After the start-up is completed, the processing unit 102 may configure the secure interface 106 and the level of security used for communication with the external processing unit 107. The processing unit 107 may then use the secure interface 106 to configure the radar circuitry 103 via the API utilizing the predefined level of security (encryption, authentication).

As an option, configuring the radar circuitry 103 via the API may comprise setting configurations of transmit parameters to emit unique identifier via FMCW or PMCW.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store program code in the form of instructions or data structures and that can be accessed by a computer. Also, any connection is properly termed a computer-readable medium, e.g., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various example implementations of the implementation have been disclosed, it will be apparent to those skilled in the art that various changes and modifications can be made which will achieve some of the advantages of the implementation without departing from the spirit and scope of the implementation. It will be obvious to those reasonably skilled in the art that other components performing the same functions may be suitably substituted. It should be mentioned that features explained with reference to a specific FIGURE may be combined with features of other FIGURES, even in those cases in which this has not explicitly been mentioned. Further, the methods of the implementation may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:
1. A radar device comprising:
a first processing unit;
radar circuitry associated with receiving and transmitting a radio signal;
at least one security circuitry;
at least one secure memory comprising first information for configuring the radar device; and
a secure interface configured to communicate with an external device, that is external to the radar device, comprising a second processing unit,
wherein the external device does not include the radar circuitry, and
wherein the first processing unit is to at least one of configure, monitor, or run the radar device based on second information associated with parameters obtained via the secure interface from the second processing unit.

2. The radar device according to claim 1, wherein the second processing unit is authenticated with the first processing unit.

3. The radar device according to claim 1, wherein a communication between the first processing unit and the second processing unit is at least partially encrypted.

4. The radar device according to claim 1, wherein the radar device is a Monolithic Microwave Integrated Circuit (MIMIC) or is part of a MIMIC.

5. The radar device according to claim 1, wherein the radar device provides an application programming interface to enable a communication with the second processing unit.

6. The radar device according to claim 1, wherein the secure interface utilizes a secured data exchange memory.

7. The radar device according to claim 1, wherein the radar circuitry includes at least one of:
   a phase-locked-loop,
   a transmission circuitry,
   a reception circuitry,
   an analog-to-digital-converter, or
   a filter.

8. The radar device according to claim 1, wherein the security circuitry is configured to conduct at least one of symmetric or asymmetric encryption, authentication, at least one hash function, or signature processing.

9. The radar device according to claim 1, wherein the at least one secure memory comprises at least one of a key or a seed.

10. The radar device according to claim 9, wherein at least one key is associated with an activation or a deactivation of a feature of at least one of the radar circuitry or the first processing unit.

11. The radar device according to claim 9, wherein at least one key sets a range of the radar circuitry, including at least one of the following ranges:
    a transmission power,
    a transmission bandwidth, or
    a sampling rate.

12. The radar device according to claim 9, wherein at least one key sets at least one of a number of available transmission channels or a number of available receiving channels.

13. The radar device according to claim 9, wherein at least one key is associated with a unique identifier that is transmitted by the radar circuitry utilizing a frequency modulated continuous wave (FMCW) or a pseudo-code for phase modulated continuous wave (PMCW) modulation.

14. The radar device according to claim 1, wherein the at least one secure memory comprises data that is used for booting the first processing unit.

15. A vehicle comprising at least one device according to claim 1.

16. A method for operating and/or configuring a radar device wherein the radar device comprises:
    a first processing unit;
    radar circuitry associated with receiving and transmitting a radio signal;
    at least one security circuitry;
    at least one secure memory comprising first information for configuring the radar device; and
    a secure interface configured to communicate with an external device, that is external to the radar device, comprising a second processing unit that is external to the radar device,
    wherein the external device does not include the radar circuitry, and
    wherein the method comprises:
        at least one of operating or configuring the radar device via the first processing unit based on second information associated with parameters obtained via the secure interface from the second processing unit.

17. A computer program product directly loadable into a memory of a digital processing device, comprising software code portions for performing the steps of the method according to claim 16.

* * * * *